(12) United States Patent
Zack et al.

(10) Patent No.: US 11,857,489 B2
(45) Date of Patent: *Jan. 2, 2024

(54) SAUNA SYSTEM WITH COMMUNICATION, NETWORKING, AND GLOBAL INFRASTRUCTURE

(71) Applicant: Sunlighten, Inc., Overland Park, KS (US)

(72) Inventors: Aaron Michael Zack, Overland Park, KS (US); Mohsin Thara, Kansas City, MO (US); William Rock, Overland Park, KS (US)

(73) Assignee: Sunlighten, Inc., Overland Park, KS (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/052,691

(22) Filed: Nov. 4, 2022

(65) Prior Publication Data

US 2023/0097042 A1    Mar. 30, 2023

Related U.S. Application Data

(63) Continuation of application No. 16/549,432, filed on Aug. 23, 2019, now Pat. No. 11,491,079.

(60) Provisional application No. 62/723,741, filed on Aug. 28, 2018.

(51) Int. Cl.
| | |
|---|---|
| G06F 15/16 | (2006.01) |
| A61H 33/06 | (2006.01) |
| A61H 33/00 | (2006.01) |
| H04L 67/12 | (2022.01) |

(52) U.S. Cl.
CPC ......... *A61H 33/066* (2013.01); *A61H 33/005* (2013.01); *H04L 67/12* (2013.01); *A61H 2033/0079* (2013.01); *A61H 2033/061* (2013.01); *A61H 2201/5012* (2013.01); *A61H 2201/5043* (2013.01); *A61H 2201/5048* (2013.01)

(58) Field of Classification Search
CPC ....... H04L 67/12; H04L 67/14; H04L 67/125; A61H 33/06; A61H 2033/063; A61H 2033/066; A61H 2033/067; A61H 2033/068

See application file for complete search history.

(56) References Cited

U.S. PATENT DOCUMENTS

| | | | |
|---|---|---|---|
| 7,548,111 B2 | 6/2009 | Ichitsubo et al. | |
| 7,596,296 B2 | 9/2009 | Hendrickson et al. | |
| 11,491,079 B2 * | 11/2022 | Zack | H04L 67/12 |
| 2004/0184793 A1 | 9/2004 | Schaeffer et al. | |

(Continued)

*Primary Examiner* — Yves Dalencourt
(74) *Attorney, Agent, or Firm* — AVEK IP, LLC; Mark C. Young

(57) ABSTRACT

A sauna having heating and lighting elements includes control circuitry which links the sauna to a remote server. The remote server provides information and media files for presentation to a user and collects and stores user profile and usage information. Multiple saunas are be linked into a network or global infrastructure so that a user's profile and usage information follow the user to any sauna connected to the network. Collected data can be used by users to track individual usage and performance metrices, and by service providers to analyze usage data and information for operational and marketing purposes.

20 Claims, 7 Drawing Sheets

(56) References Cited

U.S. PATENT DOCUMENTS

| | | |
|---|---|---|
| 2004/0188415 A1 | 9/2004 | Lee |
| 2004/0260364 A1 | 12/2004 | Daffer et al. |
| 2006/0123053 A1 | 6/2006 | Scannell |
| 2009/0235447 A1 | 9/2009 | Zack et al. |
| 2011/0195664 A1 | 8/2011 | Keirstead et al. |
| 2014/0278684 A1 | 9/2014 | Masciarelli et al. |
| 2015/0322652 A1 | 11/2015 | Mazz et al. |
| 2016/0271012 A1 | 9/2016 | Xu |
| 2016/0379679 A1 | 12/2016 | Chen |
| 2017/0273865 A1 | 9/2017 | Duncan |
| 2017/0312172 A1 | 11/2017 | O'Keeffe et al. |
| 2019/0167519 A1 | 6/2019 | Kaps et al. |

\* cited by examiner

SAUNA SYSTEM WITH COMMUNICATION, NETWORKING, AND GLOBAL INFRASTRUCTURE

CROSS-REFERENCE TO RELATED APPLICATIONS

This application claims the benefit of U.S. patent application Ser. No. 16/549,432, filed Aug. 23, 2019, the disclosure of which is hereby incorporated herein in its entirety by reference.

BACKGROUND

Saunas are popular for providing heath therapy to users, with dry heat home saunas for one or more users becoming increasingly common as home accessories. Traditional saunas are also popular, and spa facilities offering access to various types of saunas allow users to select the type of sauna used at any given session.

Most saunas are stand alone and locally controlled, with each subsequent user of a sauna required to set-up and select the sauna features they desire each time they use the sauna. Even within a facility, moving to a different sauna device typically requires adjusting settings from what a prior user had selected. Coupled with that, some find the sauna experience repetitive, with little variation in the experience each time the sauna is used. While some saunas provide television or music playback features, such traditional programming often actually detracts from the sauna experience.

Thus, it can be seen that there remains a need in the art for saunas that are easier to use and cater to the user's desire for a seamless sauna experience.

SUMMARY

Exemplary embodiments are defined by the claims below, not this summary. A high-level overview of various aspects thereof is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes methods and systems for sauna systems having communication capability and support for networked global infrastructure allowing intercommunication between saunas, studios, salons, and other facilities as well as integration with users' smart devices and with providers' point of sale, operation, and marketing systems.

A sauna having a video display device, a loudspeaker device, lighting elements, an aromatherapy device, and a user interface device, includes communication and control circuitry which links the sauna to a remote server. The remote server provides media files for display or presentation to a user and collects and stores user profile, preference, and usage information. Multiple saunas are linked into a network or global infrastructure so that a user's profile, preferences, and usage information follow the user to any sauna connected to the network. Thus, a user entering a sauna at a facility other than their home or usual facility can seamlessly access and experience material just as if he or she were at their home facility. Similarly, the separate facilities can collect and centrally record preference and usage data of the user to track individual usage and performance metrices, and service providers can analyze and use the users' data and for operational and marketing purposes.

In one embodiment a sauna, such a far infrared sauna system, is equipped or provided with a video display device, a speaker device, lighting elements, an aromatherapy device, and a user interface device, all of which are in communication with control circuitry that allows local control of the sauna's heating and lighting by a user, and further provides communication with remote systems, such as a central system within a salon or spa facility, and/or with a central system at a geographically disparate location, such as a headquarters or data center for a spa chain. In further embodiments, the control circuitry interfaces with users' smart devices to allow user control of sauna parameters from their devices, and with health monitoring devices, such as heart rate, step, and other devices to allow control of the sauna based on those monitored parameters and to allow recording fitness parameters to the user's profile.

In one embodiment, a user communicates with the sauna by providing an identification name, number, or code associated with the user upon beginning use of the sauna. The code may be embedded on or in an identification card which may be scanned by the user to activate the sauna, or the code may be provided via a smart device such as a smartphone using RFID communication with the control circuitry. In other embodiments, the code or identification may be entered via the user interface. Once identified, the user may access features available from a central system, such as video or audio content, and data associated with the user's activity can be saved by the system. In some embodiments, such as at a spa facility, the identification of the user may be performed by the operator of the facility in conjunction with allowing access to the facility, with the operator assigning a particular sauna to a user, with the individual sauna then tied in to the central system so that the assigned user can access content and their activity can be tracked.

In one aspect, the system allows a user to operate a sauna and control the heating and lighting to desired levels. In another aspect, a user may access a library of prerecorded material which provides a virtual reality type of experience to the user by providing content to the heating, video, audio, lighting, and aromatherapy devices in the sauna, with the content controlling the experience of the user in the sauna. In another aspect, the system allows a user to live-stream content from other users, such as guided meditation or stretching exercises.

In a further aspect, the system logs users' activities and builds a user profile, allowing the presentation of user favorite settings or other content based on past usage by that user. The user profile preferably follows the user regardless of the particular facility used, so that a user member of a spa chain may visit a facility in another city and have virtually identical access to his or her desired content and settings.

In a further aspect, the system logs user data to allow providers, spa facilities, and spa chains to monitor usage patterns, demand, favorite content, and various other usage data in order to improve customer service and adjust to customer needs. Preferably, the sauna system in integrated into the provider's point of sale (POS) and/or access system so that a user can seamlessly access facilities, access content, and even pay for premium services across the system.

In another aspect, the system allows providers, spa facilities, and spa chains to increase revenues by providing advertising targeted to particular users or groups of users based upon usage data. Providers may also offer premium audio, video, or virtual reality content to users, with the user able to select content from the user interface in the sauna.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations that are insignificant to the function.

Figure 1:
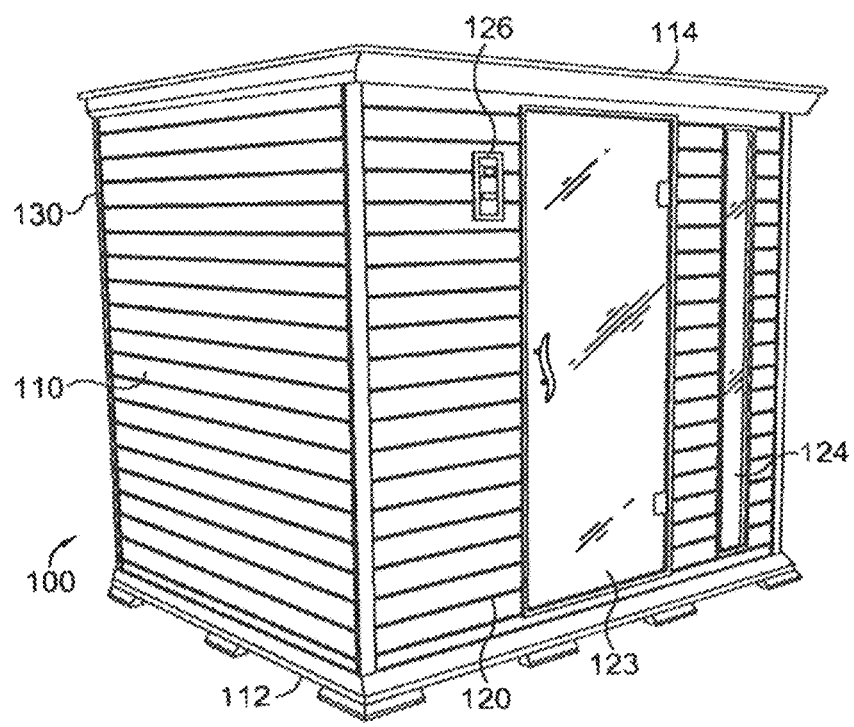
FIG. 1 is a perspective view of the exterior of a sauna having communication and networking capability in accordance with an exemplary embodiment of the present invention.

Referring to FIG. 1, a sauna with communication and networking capability in accordance with an exemplary embodiment of the present invention is depicted generally by the numeral 100. Sauna 100 includes a base panel 112, upright side panels 110 extending upwardly from base panel 112, a top panel 114 surmounting the side panels 110 so as to define a sauna enclosure. The sauna illustrated in FIG. 1 also includes a rear panel 130 and a front panel 120 having a door 123 disposed therein. It will be appreciated by those skilled in the art that the door 123 may be made of any number of various materials such as, for example, glass, wood, or particle board. The front panel 120 has a window 124 disposed between the door 123 and one of the side panels 110. It will be further appreciated by those skilled in the art that the panels and other components of a sauna 100 could be built using wood, metal, ceramics, or any other material available.

An external control panel 126 for user control of various sauna features such as, for example, heating, lighting, or entertainment devices is attached on the front panel 120 wall near the door 123. In other embodiments, a sauna may not have an external control panel 126, but only an internal control panel, as discussed below. In further embodiments, a sauna may be provided with an external control panel that is not attached to the sauna, but rather is at a remote location such as, for example, a desk or control station in a health club. All of these arrangements, and all combinations thereof, are within the scope of the present invention.

Although the illustrated sauna has a generally rectangular configuration, other configurations are contemplated by the present invention, and various saunas may be used in conjunction with the present invention. For example, a Signature® sauna or a Solo® sauna configured for use with a single user, available from Sunlighten Saunas of Overland Park, Kansas are well-suited for use with the present invention.

Figure 2:
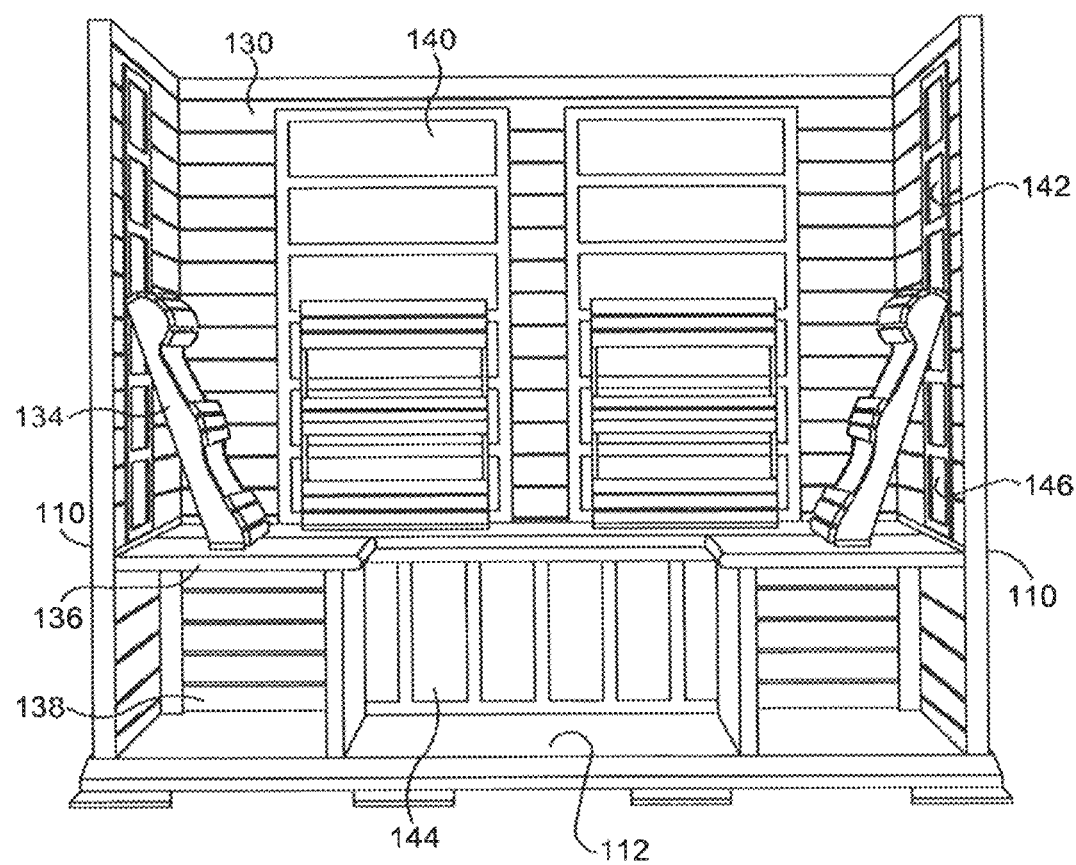
FIG. 2 is a cut-away front view of the sauna of FIG. 1 showing the interior of the sauna.

Turning now to FIG. 2, a cut-away front view of a sauna such as the sauna 100 illustrated in FIG. 1 is shown. As illustrated, in one exemplary embodiment, the sauna 100 may include one or more seating structures 136, such as benches, chairs, or other seating structures. The seating structures 136 may be disposed adjacent to any of the various internal walls of the sauna such as for example, the side walls 110 or the back wall 130. In various embodiments, such as the one depicted in FIG. 2, the sauna may include open spaces 138 disposed underneath the seating structures 136 and adjacent the interior walls 110 or 130. The open spaces 138 may be left open, used for storage, used to house other sauna feature devices, or may be used for any other purpose and in any other manner known in the art. In the illustrated embodiment, the sauna 100 is also provided with backrests 134 disposed on top of the seating structures 136 for supporting a user in an upright, seated position.

Additionally, the sauna 100 is equipped with heat sources 140,142,144,146, which are operable to heat the enclosure. The heat sources 140,142,144,146 are preferably configured to emit infrared radiation at varying wavelengths within the sauna so as to provide both heating and desirable IR treatment. In some embodiments, the heat sources may be adjustable to emit infrared radiation at any wavelength within the infrared wavelength spectrum such as, for example, near infrared, mid infrared, or far infrared. Other conventional heat sources and elements may likewise be used in accordance with the present invention.

With continued reference to FIG. 2, the heat sources 140,142,144,146 may be configured such that individual heat sources 140,142,144,146 or combinations of heat sources 140,142,144,146 may be selected to output wavelengths of radiation that are different than wavelengths of radiation emitted by other heat sources 140,142,144,146. Such a configuration may be optimized to achieve a zone-heating effect, where one or more heat sources 140,142,144, 146 is situated in a zone that corresponds to a particular region on a user's body, thus providing a mechanism for concentrating different levels of heat to different parts of the user's body. In an exemplary embodiment, one or more heat sources corresponding to one or more zones may be turned off such that no heat is emitted in those zones.

Figure 3:
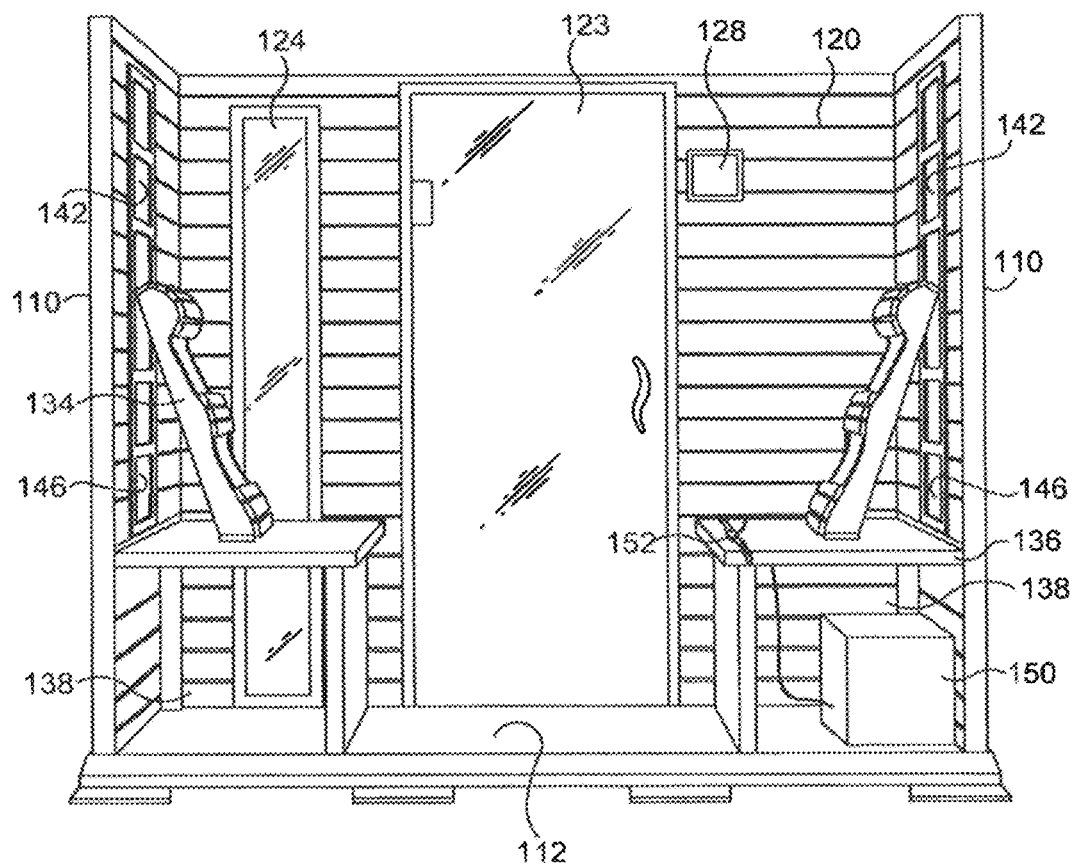
FIG. 3 is a cut-away rear view of the sauna of FIG. 1, showing the interior of the sauna.

Turning now to FIG. 3, a forward-facing cut-away view of the interior of sauna 100 is illustrated. As indicated previously, sauna 100 may include an internal control panel 128 attached, for example, to an interior side of front panel 120. The interior control panel 128 may include any number of various control panels known in the art, such as, for example, configurations that include a number of buttons, dials, switches, and/or displays disposed thereon. In the embodiment illustrated in FIG. 3, the control panel 128 preferably include a display device such as, for example, a liquid crystal display (LCD) screen, a plasma display screen, or any other type of display screen appropriate for displaying various information associated with a user's sauna experience, and an audio loudspeaker for playback of audio material. In one embodiment, control panel 128 may comprise a touch-screen display device operable to display output as well as to receive user input, where a user may interact with control panel 128 by touching the screen with a finger, stylus, or other object. In still further embodiments, control panel 128 may be a portable device such as, for example, a remote control device or module. In other embodiments, control panel 128 may be adapted to be worn by a user, such as, for example, by affixing straps to a part of the body.

Control panel 128 may be integrated with, or coupled to, any of the various controllable features associated with sauna 100. For example, in an embodiment, control panel 128 is coupled to heat sources 140,142,144,146. In other embodiments, control panel 128 may be coupled to, and thus enable control of, other features such as adjustable lighting, timing devices, and the like.

In a preferred embodiment as will be described in conjunction with FIG. 4, control panel 128 preferably includes control circuitry operable to communicate with the control panel, heat sources, and other sauna features, and further includes the capability to communicate over a network to a remote server to received media files and to transmit user information as will be described in more detail below.

Also illustrated in FIG. 3, a monitoring device 152 in communication with the control circuitry is configured to collect health data associated with a user of sauna 100. Monitoring device 152 preferably includes communication circuitry operable to communicate with user wearable devices, such as pace, step, pulse, blood pressure, and other health sensors known in the art.

Other sauna features may equally be included within the scope of the present invention. For example, acoustic resonance therapy devices may be included in the sauna and controlled by control circuitry in a manner similar to that described for other features or elements. Or voice control devices may be integrated into communication with the control circuitry so that a user may accomplish control in conjunction with the user control panel.

As discussed in more detail below, saunas 100 may be individual, personally owned devices such as in a user's home, or may be located in a spa facility having multiple identical saunas or multiple saunas having different characteristics. Regardless of the location of the sauna, the integration of global infrastructure as described herein allows the sauna experience to be controlled and tailored by each user, allows aggregation and correlation of user data by spa facilities, and provides seamless integration of user preference across a global network of spa facilities and saunas.

Figure 4:
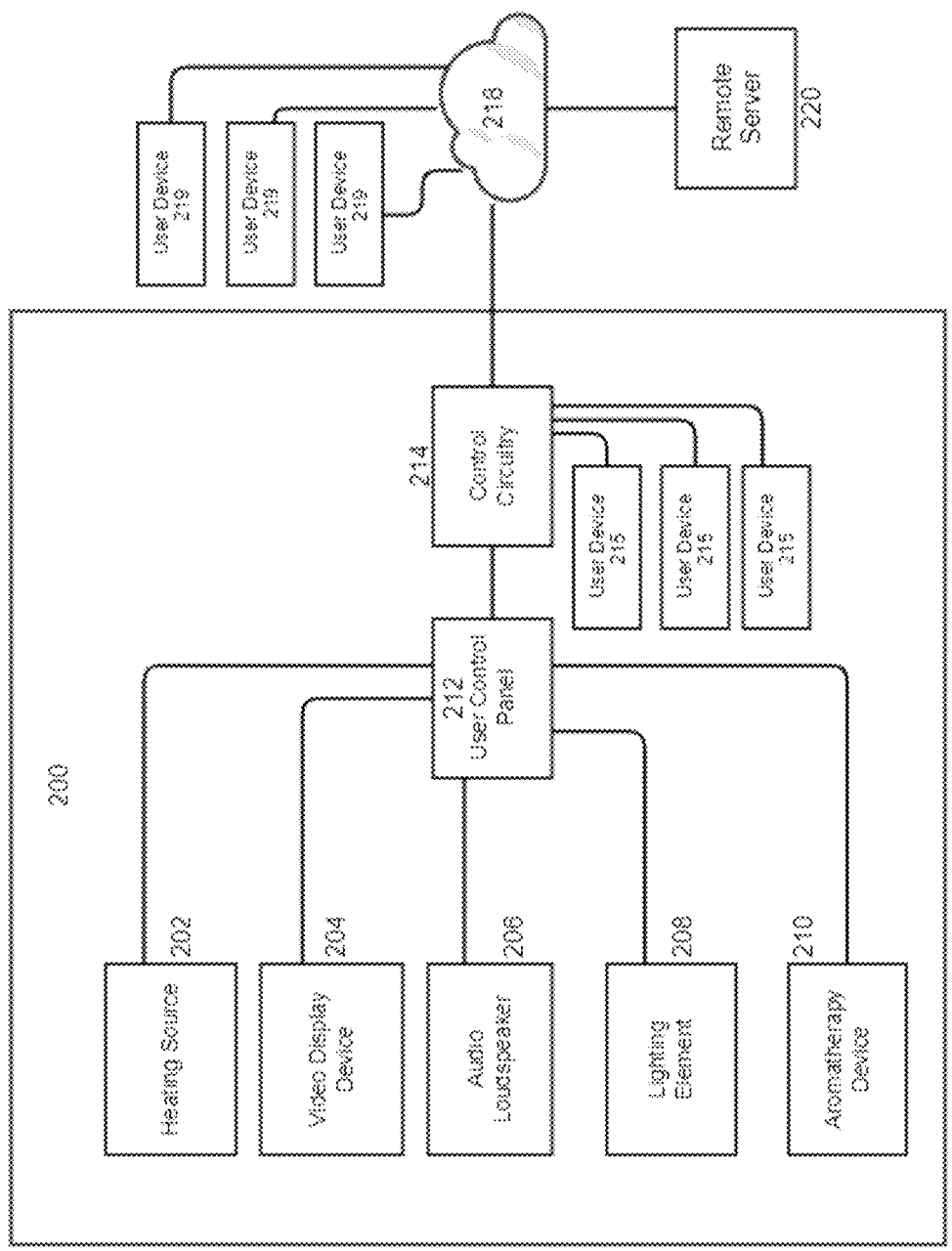
FIG. 4 is functional block diagram of the sauna of FIG. 1.

Turning to FIG. 4, a functional block diagram of a sauna in accordance with an exemplary embodiment of the present invention is depicted generally by the numeral 200. Sauna 200 includes a heating source 202 for providing heat to a user of the sauna, a video display device 204 for presenting video material to a user, an audio loudspeaker device 206 for broadcasting audio material to a user, a lighting element 208 for providing light within the sauna, and an aromatherapy device for regulating aroma within the sauna.

It should be understood that while single devices are depicted, saunas within the scope of the present invention may include a plurality of each device, may exclude some devices, or may be configured in other arrangements than those shown. For example, a particular sauna may include multiple heating sources, multiple lighting elements, and no aromatherapy device. One of skill in the art will understand that such variations are contemplated by the present invention. It should be further understood that the devices of the sauna 200 depicted in FIG. 4 correlate generally with the devices depicted and described with respect to the sauna of FIGS. 1 through 3, with additional features as will now be described.

Looking still to FIG. 4, sauna 200 includes a user control panel 212 in communication with each of the heating source 202, video display device 204, audio loudspeaker 206, lighting element 208, and aromatherapy device 210. User control panel 212 is preferably mounted on or in the sauna and allows a user to individually control elements within the sauna, such as activating heating sources, controlling the lighting elements, and the like.

User control panel 212 may include any number of various control panels known in the art, such as, for example, configurations that include a number of buttons, dials, switches, and/or displays disposed thereon. In an exemplary embodiment, the user control panel 212 incorporates the display device such as, for example, a liquid crystal display (LCD) screen, a plasma display screen, or any other type of display screen appropriate for displaying various information associated with a user's sauna experience, and the audio loudspeaker for playback of audio material. In one embodiment, user control panel 212 may comprise a touch-screen display device operable to display output as well as to receive user input, where a user may interact with user control panel 212 by touching the screen with a finger, stylus, or other object. In still further embodiments, control panel 212 may be a portable device such as, for example, a remote control device or module. In use, a user interacts with user control panel 212 to locally control the features of the sauna 200. For example, a user may locally adjust the heating, lighting, video display, audio, and aromatherapy to desired levels using the user control panel 212.

As further shown in FIG. 4, sauna 200 further includes control circuitry 214 in communication with the user control panel 212, and via that control panel, in communication with each of the heating source 202, video display device 204, audio loudspeaker 206, lighting element 208, and aromatherapy device 210. Thus, the control circuitry 214 can control each of the devices in a manner similar to the user control panel, and/or in conjunction with the user control panel 212.

In a preferred embodiment, control circuitry 214 includes communication circuitry allowing communication between the control circuitry and one or more user devices 215, for example via wired or wireless connection. The communication circuitry preferably includes wireless communication via Bluetooth, WiFi, or other protocol and/or wired communication via USB or other protocol. Control circuitry 214 preferably further comprises bridge circuitry to allow connection between a plurality of system networks, as discussed in more detail below, or between control panel 212 and a mobile device or computer.

User devices 215 may include smart devices such as smart phones, tablets, and computers, or home control devices such as Google® Home, Amazon® Alexa, or other such devices. Thus, in addition to the user control panel 212, a user may interact with and control the sauna 200 using those devices either alone or in combination. In alternative embodiments, a sauna may exclude the control panel 212 and allow for control exclusively via user devices 215.

Sauna 200 may further include a monitoring device in communication with the control circuitry 214 capable of receiving information from user-worn health devices so that user's step, pulse, and other data may be transmitted to the control circuitry for eventual recording and storage in association with a user's profile. Health devices may include heart rate monitors, biofeedback monitors, blood pressure monitors, oxygen level monitors, weight monitors, respiration monitors, and other monitors and/or sensors for measuring physical and/or biological parameters of a user. Those user parameters are preferably recorded in a user's profile. In addition, any of those parameters, or combinations of those parameters, can be used by the control circuitry 214 to control parameters of the sauna itself. In one embodiment, a system as described herein allows dynamic content to control spa parameters, for example regulating heat intensity based on specific biometric parameters of a user. In further embodiments, the system may provide an integrated music, heat, light, and aroma environment based on predetermined or dynamic content. Mood detection and other biofeedback parameters may further direct specific spa parameters such as chromotherapy individualized for each user.

In one embodiment, control circuitry 214 provides access and connection ports, plugs, or the like for the connection of user accessory devices, such as wands, and custom heaters allowing additional accessories to be added to a sauna and/or used in conjunction with the sauna and network communication capabilities as desired by a user.

Control circuitry 214 includes communication capability to allow interchange of information with a network 218 such that information from outside the sauna 200 may be supplied by a remote server 220 connected to the network (as will be described in more detail below) to operate and control the sauna 200, and information from inside the sauna 200 may be transmitted to the remote server. Thus, for example, a media file from a remote server 220 may be transmitted to the sauna 200 to allow control of the sauna in a predetermined manner, and information with respect to user selections and preferences made using the control panel 212 may be transmitted to the remote server for storage. Network 218 may be a local area network (LAN), wide area network (WAN), wired or wireless, or any combination thereof employing communications protocols as known in the art. The network 218 preferably includes a bridge connection or circuitry allowing interconnection of multiple networks to form a larger virtual network of interconnected facilities, saunas, and interconnecting networks. The bridge connection or circuitry may further allow connection between the control panel 212 and a mobile device or computer.

The network preferably includes communication circuitry to allow user devices 219, such as user laptop computers, tablets, and the like, to interconnect and communicate with the remote server 220 and/or the sauna 200 via wired or wireless connections. Thus, a user may remotely access his or her profile and preferences, access usage and performance data, and otherwise manage their data from any location having access to the network, such as over the Internet.

Access to remote server 220 by user devices 219 is preferably facilitated through a web site, web pages, or a dedicated application running on the user device.

It should be understood that the arrangement of elements and features as depicted in FIG. 4 is exemplary and not limiting, and that other configurations are anticipated by the present invention. For example, in the case of a personal sauna closely enclosing a user's body, a video display device, lighting elements, and audio loudspeaker may be located outside of the physical sauna enclosure, such as in a room where the sauna is located. And, the various components of sauna 200 may be combined or separated in different exemplary embodiments. For example, the video display device 204 may be combined with the audio loudspeaker 206, or the control circuitry 214 may be incorporated within the user control panel 212. In further embodiments the user control panel 212 may be located remotely from the sauna 200, such as at the front desk of a spa facility. These configurations and others will operate in a substantially similar manner and fall within the purview of the present invention. In other configurations, the user control panel allows communication to the front desk by the user. In further configurations the sauna or facility may include one or more large screen displays allowing a user to cast or mirror content to the larger screen as desired from their own user device or from the control panel.

Remote server 220 may be located in near or far proximity to the sauna 200, the term "remote" designating that the server is not located within the sauna. Remote server 220 may be comprised of one or more servers, cloud servers, or combinations thereof, in network communication with each other. Preferably, remote server 220 includes data storage capabilities, with user profiles, user content, and user information stored and accessible by users of the of the sauna and by providers of the sauna services. Most preferably, remote server 220 includes media server capabilities capable of streaming and/or distributing video, audio, and control content to sauna 200 via the network 218 connection. Preferably, a library of video and/or other media files is maintained on the remote server 220 to allow user selection of desired media and distribution or digital content sharing of that media over the network 218, or interconnected networks, to the user.

As will now be described, multiple saunas 200 may be grouped in communication with each other and with one or more remote servers to form a global infrastructure of interconnected saunas and facilities.

Figure 5:
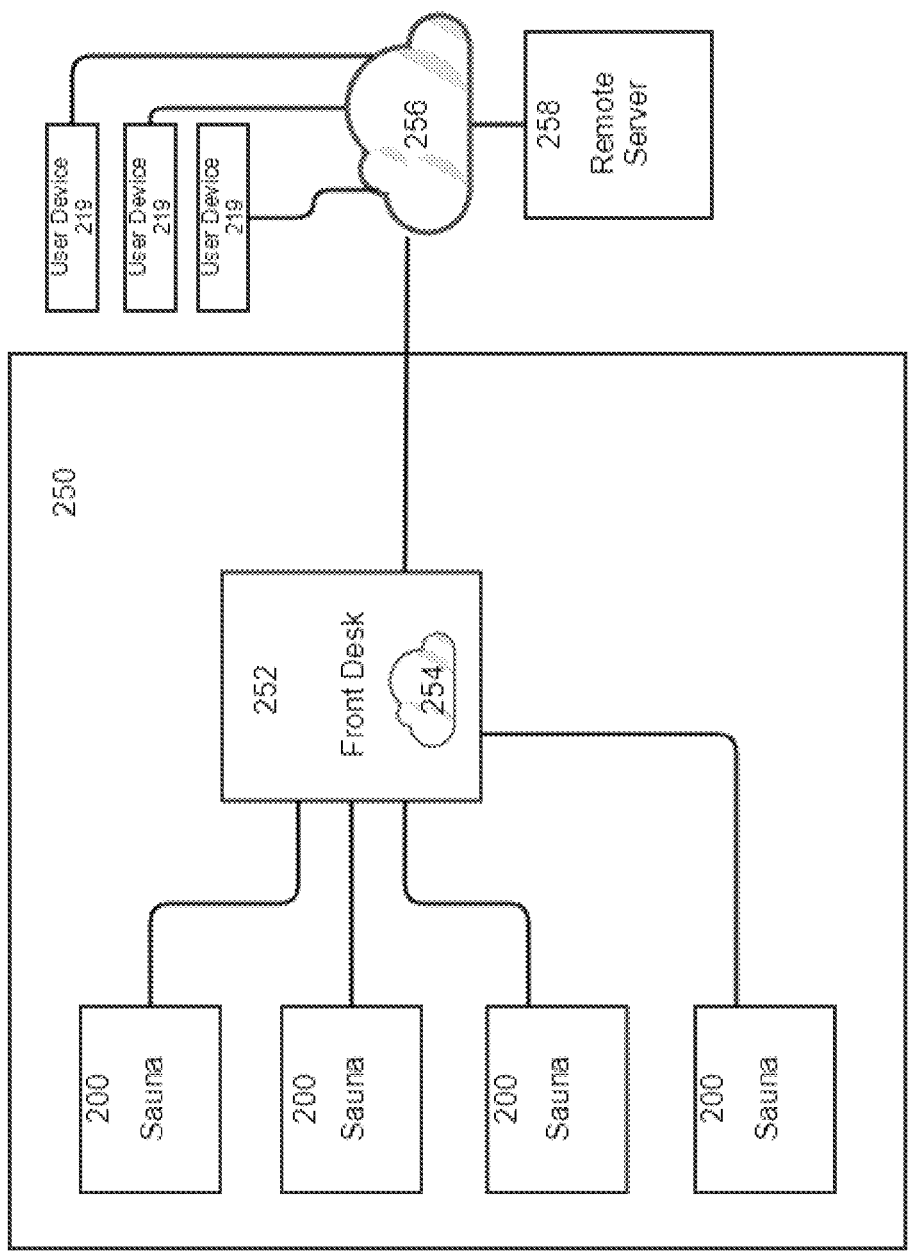
FIG. 5 is a functional block diagram of a group of saunas networked together in a single facility.
Figure 6:
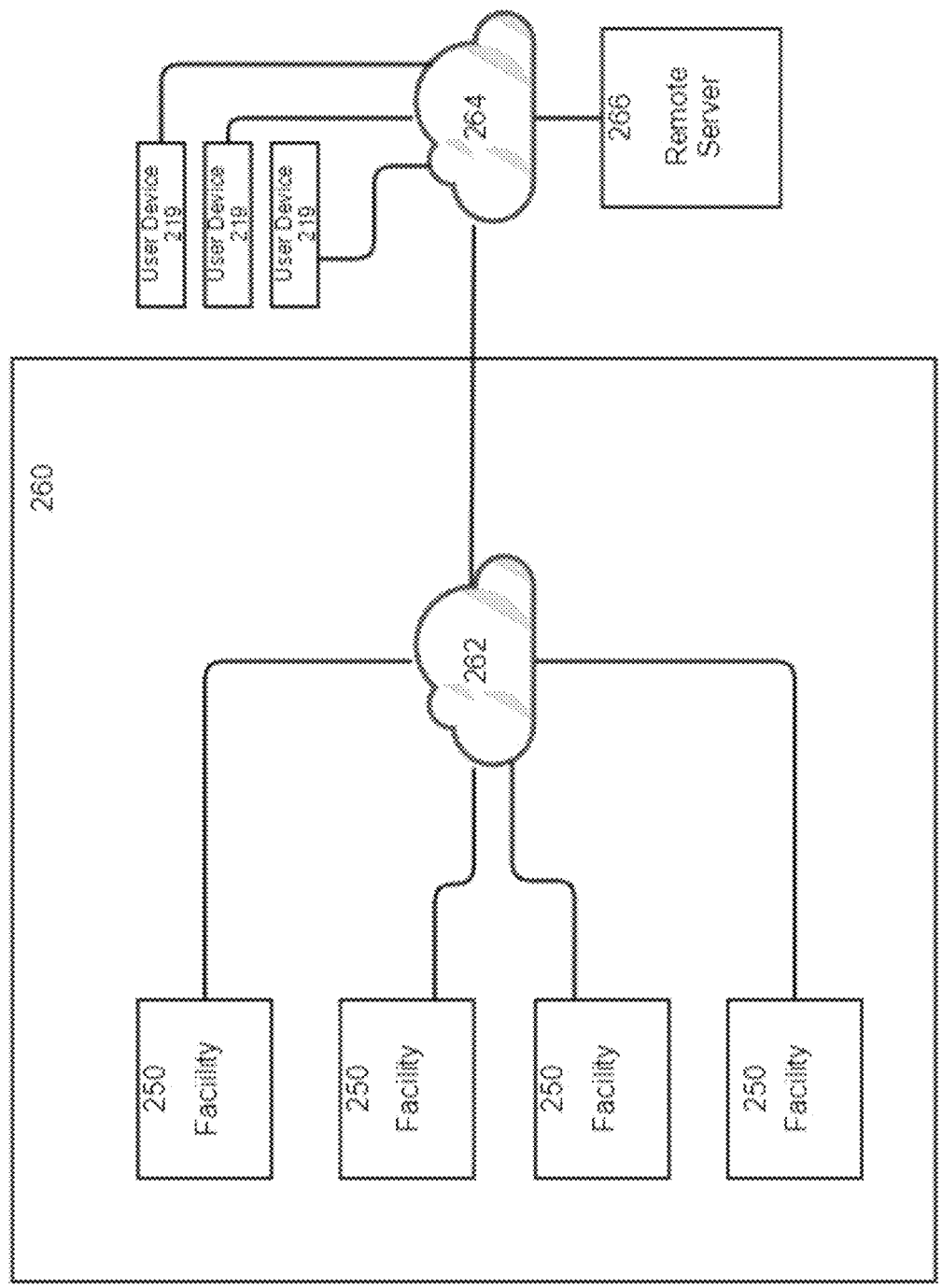
FIG. 6 is a functional block diagram of a group of geographically dispersed facilities networked together.

Looking to FIG. 5, a facility 250 comprising a plurality of saunas 200 as previously described are connected to a network interface 254, for example, a local area network located at a front desk 252 of a spa facility. The network interface 254 is in further communication with a global network, such as the Internet, which is in communication with a remote server 256. Similarly, turning to FIG. 6, a plurality of facilities 250 may be grouped to form an infrastructure 260 of interconnected individual saunas via a network interface 262 in further communication with a global network 264 and a remote server 266.

It should be understood that the configuration of the saunas 200, front desk 252, facilities 250, network interfaces, and remote servers may vary according to the needs of different users. For example, a single facility 250 may include numerous individual saunas 200 with a remote server present at the facility for providing content to the saunas, without any external network connection. Or, the front desk may include a remote server in addition to a remote server available over the global network interface. In addition, a single user may have an individual sauna not located in a facility that interconnects via a global network interface to a remote server of the networks depicted. These and various other configurations of the global infrastructure network are encompassed by the present invention.

Remote server 256, and any of the remote servers, preferably host media files comprising audio, video, and control information for playback through the control circuitry of the individual saunas 200. Thus, a user of one of the saunas 200 may, through the local user control panel as previously described, sign-in to the remote server system using a unique identification code, such as a username, password, user ID, RFID card, or other access method as is known in the art. Once connected to the remote server, the user may access media file content for playback. Media files or content may be tied to a user's membership or subscription, may be free for use, or may be purchased by a user. Combinations of media are preferably available, with some content free and some premium content available for purchase.

With the global infrastructure system of interconnected saunas set forth, various exemplary methods of using the system will now be described.

Figure 7:
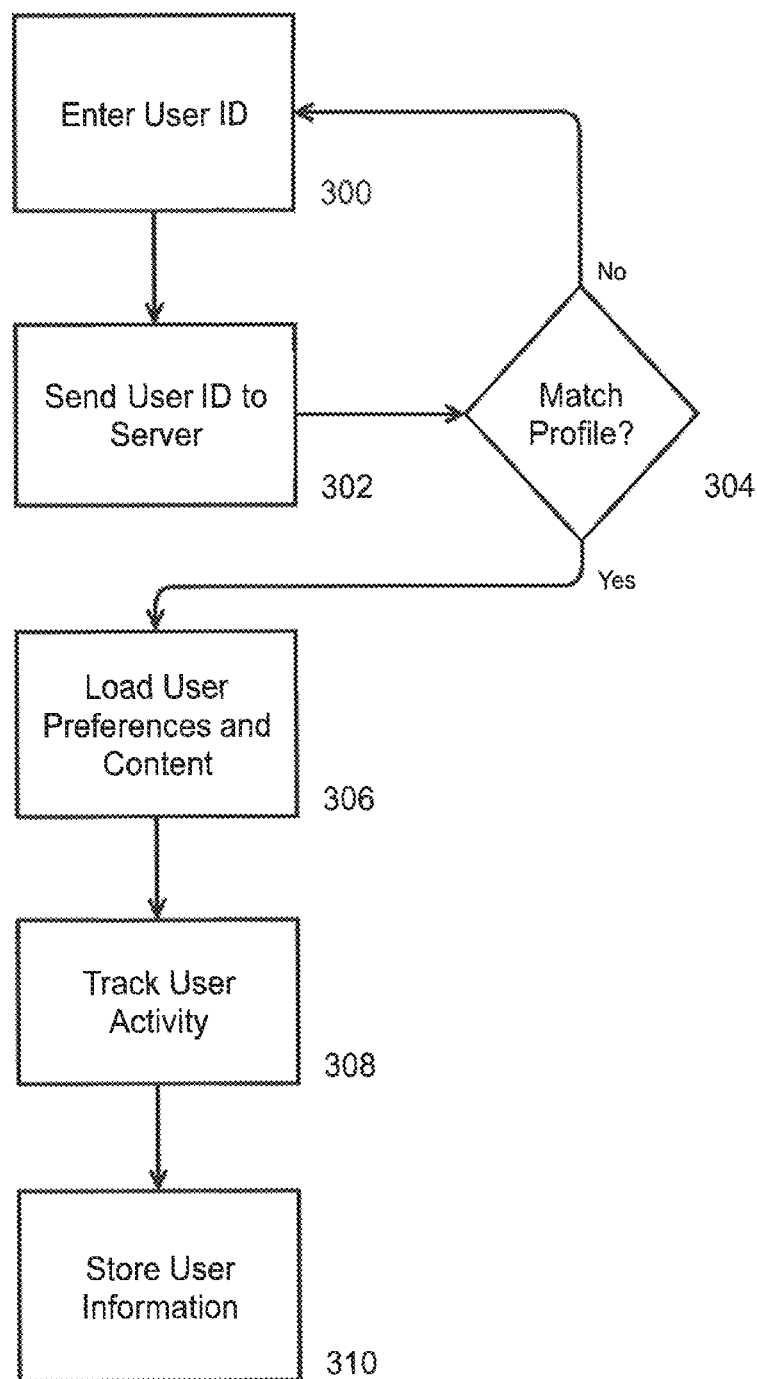
FIG. 7 is a flow diagram of an exemplary method of identifying a user and associating user information with a user profile.

Looking to FIG. 7, a user accessing the system signs in at block 300 by entering a user identification, preferably using the user control panel of an individual sauna that is interconnected to a remote server as previously described. User sign-in may be accomplished by any method known in the art, such as user ID and password, user name, identification number, access card, RFID, smartphone application, and the like.

At some facilities, the user ID may be entered at the front desk, and/or entered in conjunction with access to the facility. At block 302 the entered ID is transmitted to the remote server for verification. If the entered ID matches a known user, that user's profile is accessed, including user information previously entered, along with content available to the user. The user's profile may include information that automatically configure the sauna to the user's desired settings so that the user can immediately begin using the sauna. Preferably, the remote server also loads and provides content to the user so that the user may select various programming (as will be described in more detail below), such as audio and video material, as well as control parameters which control or alter the settings of the sauna in conjunction with the programming material.

Most preferably, at block 308 user selections made during the use of the sauna are transmitted back to the remote server for storage in conjunction with the user's profile, and at block 310 the user information is stored. The tracked and stored activity is preferably aggregated with prior user activity so that a user may access and track his or her own prior activity. In additional, user selections and activity may be used by spa and sauna providers to improve services to their customers. For example, popular content may be suggested to other users, or unpopular content may be removed from the system.

Upon accessing a remote server using the system, a user may select content for playback or access. Content may live stream program material, such as a real-time exercise program offered by an instructor or may be recorded archives of such programs. It should be understood that multiple users of the system may live stream or access the same content; thus, a real-time exercise video may be simultaneously viewed by multiple users of multiple saunas in geographically dispersed locations. Most preferably, users may interact with either live stream or recorded content by providing feedback or ratings to be associated with the content for access by the community of users of the system. Content and user information may also be integrated into predefined programs, such as wellness programs offered by insurance companies. For example, with user activity satisfying requirements for the wellness program and providing that information to the program over the network.

Media playback preferably may provide audio and video material to a user, as well as control of heating and lighting elements within the sauna, as well as other sauna features, such as aromatherapy and acoustic resonance devices. Thus, a user may select thematic program material, such as a Buddhist Temple or Garden, with the audio, video, heating, and lighting all automatically coordinated by the media file to provide the thematic experience. Choreographed control of audio, video, lighting, and heating, as well as other sauna features, provides a near virtual reality experience for the user.

In other embodiments, user data from user-worn devices may be used by the system to control sauna elements, such as adjusting the lighting elements color and/or intensity in response to a user's heart rate or adjusting the heating element intensity based on heart rate or other parameters.

In further embodiments, networking and data aggregation allows providers to analyze collected data to implement marketing strategies directed to customer preferences. For example, logos, advertising and co-branded advertising may be directed to various users based on selected criteria, such as performance level, frequency of usage, and the like. Or, providers may sell developed programming to other providers for use with their network of users. Users may further be offered premium programming through an online store presented by the remote server to the user's sauna.

In one embodiment, the networking and data aggregation provides ecommerce opportunities allowing a service provider, facility, or spa operator to customize the information provided to users either individually or in groups. For example, a provider may provide additional applications or customized applications to enhance the user experience, may provide a help section to guide a user's operation of the sauna, control panel, application, or web interface, or may provide updates to existing applications. Applications may allow control of sauna chromotherapy, audio, and the distribution of dynamic content such as on demand and live video for various activities such as stretching, yoga, meditation and the like, as well as health advice and/or health channels or podcasts. Dynamic content is preferably customizable for each user of the system, allowing the user to engage with the system prior to receiving their own sauna, or prior to or in conjunction with the use of commercial facilities.

Preferably, the system allows sending notifications to users either individually or in groups, or to existing group or social networking services, such as Facebook®. Notifications may be sent based on particular user usage or target parameters or may be based on algorithmic analysis of user usage data. Notifications may also comprise system status, such as notifications of failure of a particular component, or of upcoming maintenance requirements. For example, notifications may notify a user of lack of use of a sauna in a number of days. Further notification can advise a user of the location and/or proximity of saunas or facilities. Such notifications can likewise be directed to system service providers or facilities.

In a further embodiment, the networked system may provide a user loyalty system, providing points or reward to users based on usage, achieving goals, or other targeted achievements. Likewise, providers may notify users of special promotions or offers. In additional embodiments, the system allows users to participate in competitions and games and allow comparison and ranking of user achievements such as calories burned, sessions taken, goals achieved, and the like, with a leaderboard display of rankings in the game or contest. Game results, ranking, and information can be shared on social networks, with badges and rewards points issued to users for various accomplishments such as watching digital content, using accessories such as a plug-in wand, achieving goals, etcetera. Rewards may be used at participating facilities and commercial affiliates. In addition, geocoordinates of a user device may be used to provide information to users of nearby facilities, spas, or affiliates, or of the nearest facility.

In one embodiment, a provider or facility can control and manage individual user accounts and can manage individual saunas through the network for usability and maintenance purposes. For example, a provider may update control circuitry, control panel, applications, or other system software remotely through the network. Or a provider may allow or block sauna functionality based on a user's subscription level, or may lock out damaged or defective equipment for servicing. Additionally, a provider may remotely access a sauna to diagnose and troubleshoot any issues, with robust scans configured to identify problems, and with a sauna operable to automatically notify a provider of a problem, allowing proactive maintenance or replacement of parts without customer or user action required.

Preferably, the system provides interface capability with existing merchant and provider systems, such as point of sale systems, or applications developed by various sauna manufacturers.

From the above, it can be seen that the sauna and system of the present invention provide advantages not available in currently known saunas and systems. The networked capability allows a user to access and use a sauna virtually anywhere in the world and have access to the same features and programming that he or she may have at their home sauna, with further access to their prior activity and performance data. Thus, the user's experience between different physical locations is seamless. Similarly, providers of saunas and spa facilities can provide improved customer experience and improved customer service by following customer activities and providing features, services, and content based on actual user data.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A sauna comprising:
   an enclosure for accommodating a user;
   at least one heat source disposed within the enclosure;
   a user control panel positioned on or within the enclosure; and
   control circuitry in communication with the at least one heat source and the user control panel, wherein the control circuitry is operable to control the at least one heat source, and wherein the control circuitry comprises bridge circuitry operable to facilitate communication between a mobile device and the control circuitry to allow user control of the sauna using the mobile device, and wherein the control circuitry is operable to retrieve at least one shareable user profile from a remote server, the user profile comprising preferred settings for use by the control circuitry to control at least the heat source.

2. The sauna of claim 1, further comprising at least one lighting element in communication with the control circuitry.

3. The sauna of claim 2, wherein the control circuitry is operable to communicate with at least one user-worn health device and to control the at least one heat source, the at least one lighting element, and combinations thereof in response to information received from the at least one user-worn health device.

4. The sauna of claim 2, wherein the control circuitry is operable to regulate operation of at least one of the at least one heat source and the at least one lighting element in response to user commands entered via the user control panel.

5. The sauna of claim 2, wherein the control circuitry is operable to regulate operation of at least one of the at least one heat source, the at least one lighting element, and a media player in response to one or more media files received from the remote server.

6. The sauna of claim 5, wherein the media file comprises audio material, visual material, heat control signals, lighting control signals, and combinations thereof.

7. The sauna of claim 6, wherein the media file comprises pre-defined heating settings, lighting settings, audio material, visual material, and combinations thereof, and wherein playback of the media file correlates control of heating, lighting, audio material, visual material, and combinations thereof within the sauna to provide a desired thematic presentation to the user.

8. The sauna of claim 6, wherein the media file comprises live stream audio material and/or visual material comprised of user data.

9. The sauna of claim 5, wherein the media playback device comprises a video display screen for displaying visual material to a user and a loudspeaker for broadcasting audio material to a user.

10. The sauna of claim 1, wherein user selections entered via the user control panel are transmitted to the remote server and stored and associated with a user profile.

11. The sauna of claim 10, wherein advertising targeted to a user based on user profile associated with that user is transmitted to the media playback device for presentation to the user.

12. A system of saunas, comprising:
   a plurality of saunas in accordance with claim 1; and
   a remote server in communication with the control circuitry of at least two of the plurality of saunas, the remote server operable to distribute information to the at least two of the plurality of saunas for control of lighting elements, and control of heating elements within one or more of said plurality of saunas.

13. The system of saunas of claim 12, wherein information distributed to the at least two of the plurality of saunas is based on a user profile associated with a user of the at least two of the plurality of saunas.

14. The system of saunas of claim 13, wherein the information distributed to the at least two of the plurality of saunas is targeted advertising based on the user profile.

15. The system of saunas of claim 12, wherein information associated with a user of the at least two of the plurality of saunas is transmitted to the remote server for storage in association with a profile associated with the user.

16. The system of saunas of claim 12, wherein the plurality of saunas are geographically dispersed and wherein the remote server comprises a plurality of geographically dispersed servers in communication over a network, and wherein user profile information is shared between the plurality of servers such that user information stored on any of the plurality of geographically dispersed servers is available to an associated user at any one of the geographically dispersed saunas.

17. The system of saunas of claim 16, wherein user information from any of the plurality of any of the geographically dispersed saunas is communicated to the plurality of servers.

18. The system of saunas of claim 12, wherein the remote server is in communication with an access system of a spa facility such that users' profiles are accessible through the access system for controlling at least one of the plurality of saunas for display of visual material, playback of audio material, control of lighting elements, control of heating elements, and combinations thereof.

19. The system of saunas of claim 12, wherein the remote server provides marketing data to spa service providers based on information aggregated from usage data collected from the plurality of spas.

20. A system of saunas comprising:
a plurality of saunas, wherein each sauna comprises:
an enclosure for accommodating a user;
at least one heat source disposed within the enclosure;
at least one media playback device disposed within the enclosure;
a user control panel positioned on or within the enclosure; and
control circuitry in communication with the at least one heat source, the at least one media playback device, and the user control panel, wherein the control circuitry is operable to control the at least one heat source and the at least one media playback device and is further operable to communicate over a network to a remote server and to receive content from the remote server for playback on the at least one media playback;
wherein the remote server is in communication with the control circuitry of at least one of the plurality of saunas, the remote server operable to distribute media files and information to the at least one of the plurality of saunas for display of visual material, playback of audio material, control of lighting elements, and control of heating elements within one or more of said plurality of saunas; and
an access system in communication with the remote server such that users' profiles are accessible through the access system for controlling at least one of the plurality of saunas for display of visual material, playback of audio material, control of lighting elements, control of heating elements, and combinations thereof.

* * * * *